Sept. 8, 1942.  B. J. STEINMETZ  2,295,433
COFFEE PERCOLATOR
Filed April 21, 1941   3 Sheets-Sheet 1
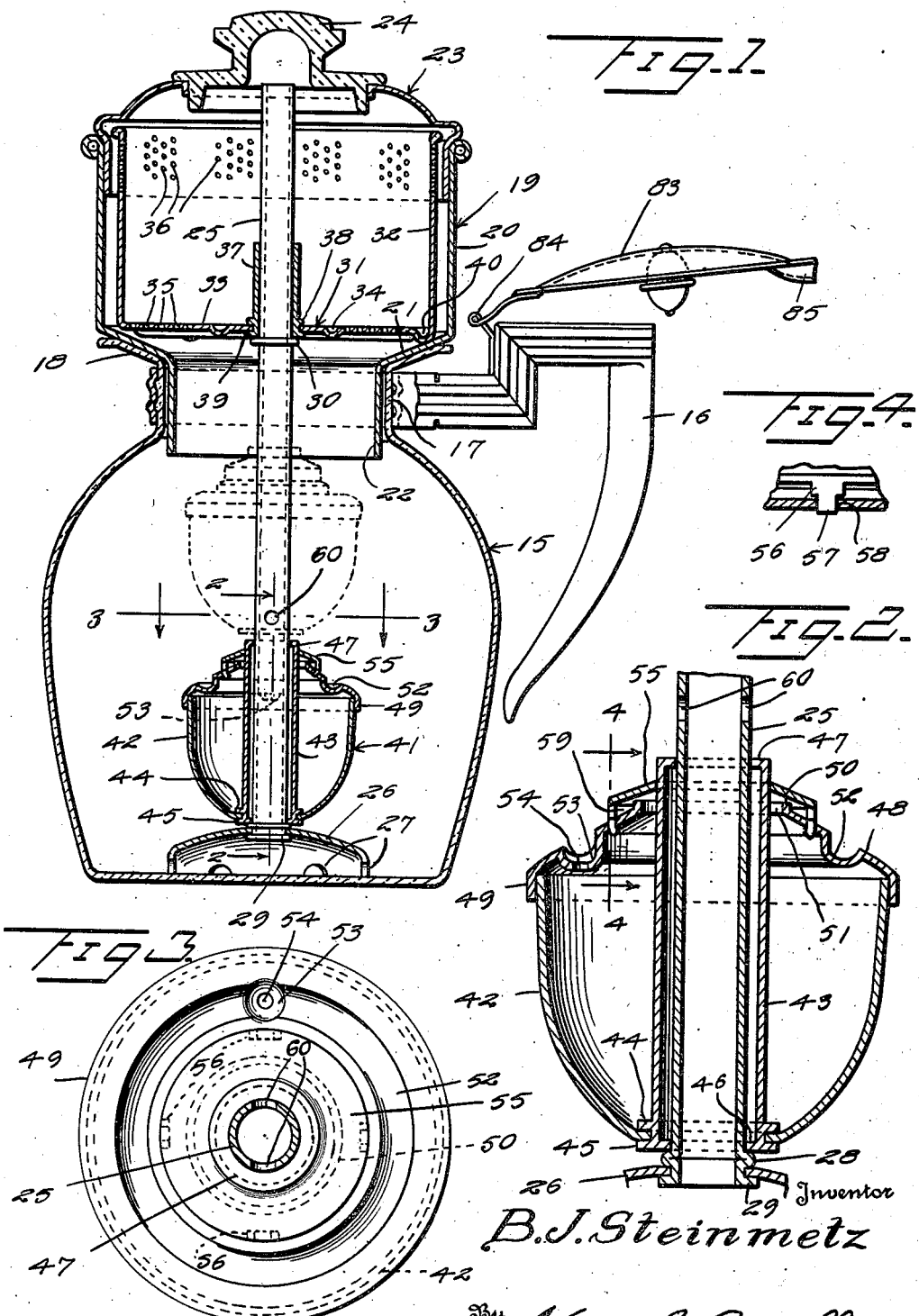
Inventor
B. J. Steinmetz
By Kimmel & Crowell
Attorneys

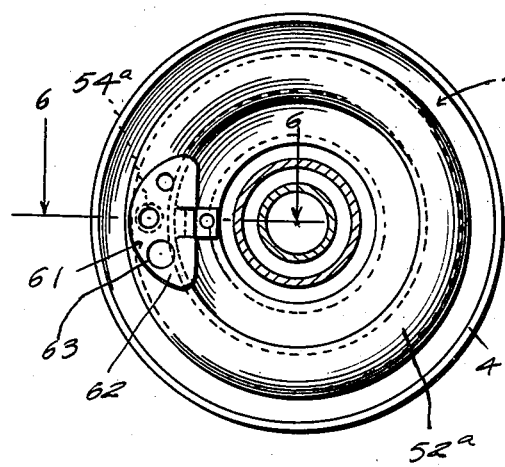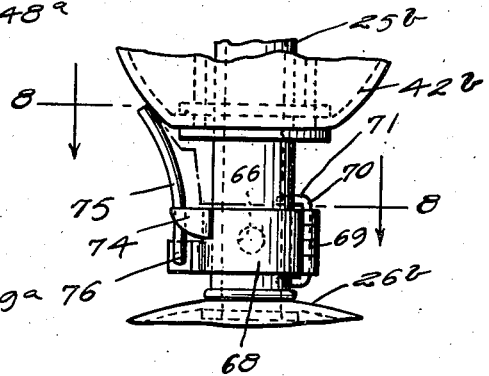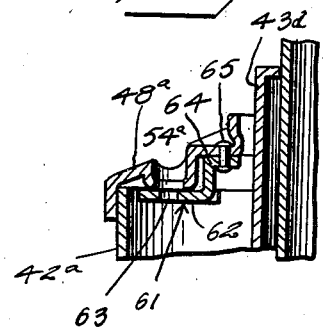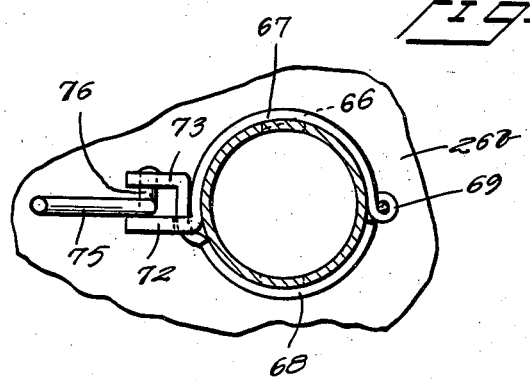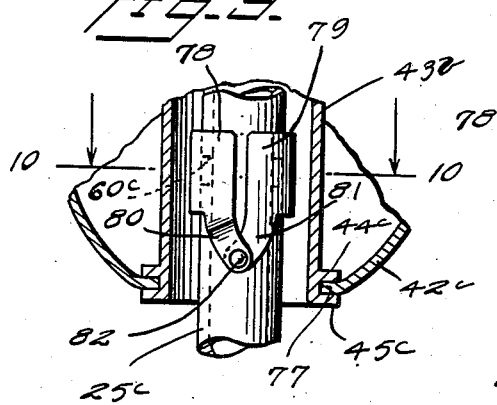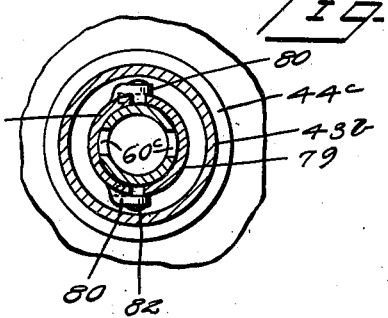

Sept. 8, 1942. B. J. STEINMETZ 2,295,433
COFFEE PERCOLATOR
Filed April 21, 1941 3 Sheets-Sheet 3
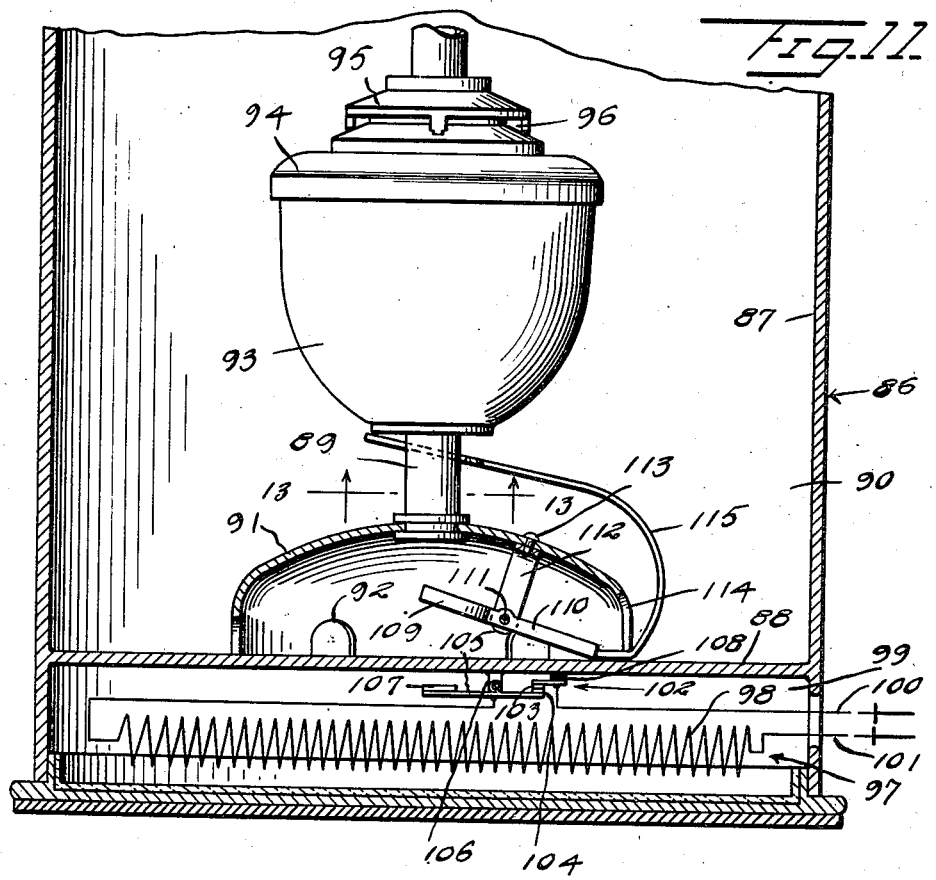
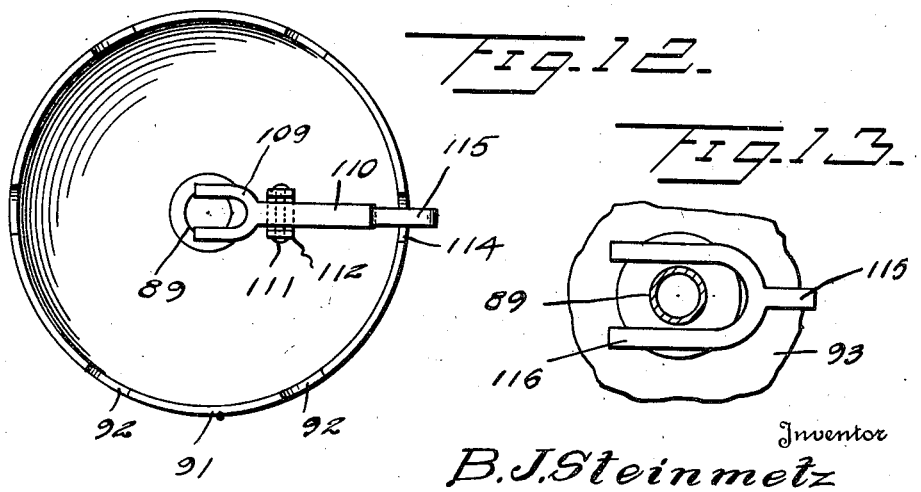
Inventor
B. J. Steinmetz
By Kimmel & Crowell
Attorneys Patented Sept. 8, 1942

2,295,433

UNITED STATES PATENT OFFICE 2,295,433

COFFEE PERCOLATOR

Benjamin J. Steinmetz, Cedarhurst, N. Y.

Application April 21, 1941, Serial No. 389,643

17 Claims. (Cl. 219—44)

This invention relates to beverage brewing apparatus and more particularly to that type known as a percolator.

It is well known that attempts have heretofore been made to regulate the strength of the brew by thermostatic or other means, but the drawback to the prior devices is that in some cases the heating medium is cut off at a predetermined time and unless the brew is used immediately it will cool and require a subsequent heating. It is, therefore, an object of this invention to provide a brew regulating means, which is automatically operable after a predetermined brewing period to cut off circulation of the liquid through the brew material in such a manner that the pot or receptacle containing the brew may be left on or connected with the heating medium for an indefinite period without affecting the strength of the brew.

Another object of this invention is to provide a brew regulating means for a percolator which is so constructed that when a predetermined brew strength has been obtained the brewing operation is automatically cut off.

A further object of this invention is to provide in a percolator an initially buoyant controlling element which is slidable on the fluid conducting tube and which has the buoyancy thereof gradually reduced by the fluid drippings from the ground coffee container.

A further object of this invention is to provide in a percolator an initially buoyant circulation controlling element, which is so constructed that at a predetermined period in the percolating operation the element will become non-buoyant, at which time the element will effect a circulation of the liquid within the coffee pot without the liquid passing through the coffee holder.

A further object of this invention is to provide in a percolator an initially buoyant circulation controlling element which is adapted to receive the drippings from the coffee or brew material holder and which is so constructed that the time period for rendering the element non-buoyant may be controlled or adjusted in order to provide for the desired strength or concentration of brew in the coffee pot.

A further object of this invention is to provide a brew strength regulator which is affected in its operation by the circulation of the brew and which after a predetermined brewing period will stop circulation of the liquid to the brew material holder and effect circulation of the brew within the brew container without changing the strength of the brew.

A further object of this invention is to provide a brew strength regulating means, which includes a generating dome, a fluid conducting tube rising from the dome, a brew material holder carried by the tube, and a brew regulator movable on the tube between the dome and the holder for receiving the drippings from the holder and for establishing communication between the dome and the brew container at a point below the holder after a predetermined brewing period.

To the foregoing objects and to others which may hereinafter appear, the invention consists of the novel construction, combination and arrangement of parts as will be more specifically referred to and illustrated in the accompanying drawings wherein is shown an embodiment of the invention, but it is to be understood that changes, variations and modifications may be resorted to which fall within the scope of the invention as claimed.

In the drawings:

Figure 1 is a vertical section of a beverage brewing apparatus of the type known as a percolator having a brew controlling device mounted thereon which is constructed according to this invention, Figure 2 is an enlarged fragmentary vertical section taken on the line 2—2 of Figure 1, Figure 3 is a sectional view taken on the line 3—3 of Figure 1, Figure 4 is a fragmentary sectional view taken on the line 4—4 of Figure 2, Figure 5 is a sectional view of a modified form of regulator cap, Figure 6 is a fragmentary sectional view taken on the line 6—6 of Figure 5, Figure 7 is a fragmentary side elevation of another modification of this invention, Figure 8 is a sectional view taken on the line 8—8 of Figure 7, Figure 9 is a fragmentary vertical section partly in side elevation of a further modification of this invention, Figure 10 is a sectional view taken on the line 10—10 of Figure 9, Figure 11 is a vertical section partly in detail of a further modification of this invention, Figure 12 is a bottom plan of the apparatus, and Figure 13 is a fragmentary sectional view taken on the line 13—13 of Figure 11.

Referring to the drawings and first to Figures 1 to 4 inclusive, the numeral 15 designates generally a brew container in the form of a transparent coffee pot or the like, which is provided with a handle 16 engaging about the neck 17 of the container 15. The upper portion of the container 15 is provided with an outwardly flared seat 18 on which a receptacle generally designated as 19 is adapted to seat. The receptacle 19 is constructed in the form of a cylindrical body 20 having a tapered lower portion 21 engaging on the seat 18 and a cylindrical neck 22 extends from the bottom tapered wall 21 and engages loosely within the neck 17 of the container 15. A cap structure 23 is removably mounted in the receptacle 19 and includes a percolator cap 24, which is removably mounted in the cap structure 23.

A vertically disposed brew conducting tube 25 is disposed within the receptacle 15 and extends upwardly into the receptacle 19 and terminates adjacent the lower portion of the cap structure 24. The tube 25 has fixed to the lower end thereof a steam generating dome 26 provided with openings 27 through which the liquid is adapted to pass. The dome 26 is secured to the lower end of the tube 25 by means of an upper flange 28 and a lower flange 29. The lower flange 29 is formed by upsetting the lower end of the tube 25. The tube 25 at a point downwardly from the upper end thereof has fixed thereto an annular flange or rib 30 on which a brew material holder generally designated as 31 is adapted to engage.

The brew material holder 31 is formed with a cylindrical side wall 32 and a flat bottom wall 33 formed with a plurality of detents 34 and perforations or openings 35. The side wall 32 is also provided with a plurality of openings 36. A guide tube 37 is disposed centrally of the holder 31 and engages loosely about the tube 25. The guide member 37 is secured to the bottom wall 33 by means of upper and lower ribs 38 and 39, which are formed on the lower end portion of the guide tube 37. The holder 31 is also provided with a plurality of detents or legs 40, which are adapted to engage the inclined bottom wall 21 of the outer receptacle 19 so as to maintain the outer marginal portions of the bottom wall 33 in upwardly spaced relation to the bottom wall 21 in order that the brew or liquid may freely flow downwardly over the bottom wall 21.

A brew controlling or regulating member generally designated as 41 is slidably carried by the tube 25 between the dome 26 and the holder 31. The regulating member 41 includes an upwardly opening cup-shaped member 42, which is secured at its lower end portion to a tube 43 loosely engaging about the tube 25. The tube 43 is provided with a pair of flanges 44 and 45 which tightly secure the receptacle 42 onto the lower end of the tube 43. The tube 43 at its lower end is provided with an inwardly extending flange or rib 46, which slidably engages the tube 25 and the tube 43 is also provided at its upper end with an inwardly extending flange or rib 47. In this manner in the event any coffee grounds or other granulated material should engage between the tube 43 and the outer side of the tube 25, the granular material will be positioned between the two flanges 46 and 47 and will not prevent the free sliding movement of the tube 43 on the tube 25.

A substantially frusto-conical cap 48 provided with a cylindrical depending flange 49 removably engages the upper end portion of the cup or buoyant body 42 and the cap 48 is provided with an upwardly extending rib 50, which is substantially greater in diameter than the diameter of the tube 43, so as to provide an air vent 51 between the rib 50 and the outer side of the tube 43. The cap 48 is provided at a point between the rib 50 and the flange 49 with an annular groove 52, which is formed by depressing the metal forming the cap 48. This groove 52 is adapted to receive the drippings which come from the perforated bottom wall 33 of the holder 31 and the cap 48 is also provided with a detent 53 within the groove 52, which is formed with an opening 54, so that the liquid or brew entering the groove 52 may flow into the buoyant regulating body 42 in order to decrease the buoyancy of the regulating body 42 until the buoyancy has been overcome and the body 42 will then gravitatingly move downwardly along the tube 25.

A substantially frusto-conical plate 55 is mounted on the cap 48 and is provided with a plurality of circumferentially spaced apart lugs or extensions 56, which terminate in clips 57. The clips 57 are adapted to be extended through the slots 58 formed in the cap 48 above the groove 52 so that the plate 55 will be held in upwardly spaced relation to the upper side of the cap 48. This plate 55 constitutes a deflector for deflecting the liquids and also provides an air passage 59 between the under side of the baffle or deflector 55 and the upper side of the cap 48 in order that the air passing upwardly through the vent 51 may be exhausted from the body 42 as the liquid enters the body through the opening 54. The tube 25 at a point upwardly from the lower end thereof is provided with a pair of diametrically opposed openings 60, which when the body 42 is in the position shown in Figure 2, are adapted to break the circulation of the brew through the entire length of the tube 25. When the body 42 is entirely buoyant this body will be in the position shown in dotted lines in Figure 1 and at this time the openings 60 will be covered by the tube 43, so that the brew may freely flow upwardly through the tube 25 and into the holder 31. However, after the regulating member 42 has lost its buoyancy and gravitatingly drops downwardly to the position shown in full lines in Figure 1, the openings 60 will be uncovered and the brew or liquid will then flow out of these openings 60 below the holder 31. In this manner the circulation of the brew through the entire length of the tube 25 is broken and the container 15 may be left on the heating means for an indefinite period without affecting the strength of the brew.

The size of the openings 54 in the cap 48 will determine the time period within which the regulating member 42 will retain its buoyancy and it will of course be understood that caps with different sizes of openings 54 may be used with the body 42 in order to provide the desired strength of brew.

Referring now to Figures 5 and 6, there is disclosed a cap structure 48a which is similar in substantially every detail to the cap structure 48 being provided with a marginal flange 49a and a groove 52a. The cap structure 48a is formed with a relatively large drain opening 54a within the groove 52a and in order to provide a means whereby the liquid passing through the opening 54a may be regulated in its flow to the receptacle I have provided a valve member generally designated as 61. The valve member 61 includes a plate 62 provided with a plurality of different sized openings 63, which are adapted to be selectively positioned in registry with the opening 54a. An L-shaped arm 64 is formed integral with the valve plate 62 and is pivotally secured, as at 65, to the cap 48a.

Referring now to Figures 7 and 8, there is disclosed a modified form of circulation breaking means for the brew. The brew conducting tube or pipe 25b is formed adjacent the lower end portion thereof with a pair of diametrically opposed openings 66, which are positioned closely adjacent the dome 26b. A pair of semi-cylindrical valve plates 67 and 68 are adapted to engage about the tube 25b and to initially cover the openings 66 so that the brew may freely flow upwardly through the tube 25b and the brew material holder. The two valve members 67 and 68 are provided at one end thereof with a hinged barrel 69 through which a pintle 70 engages. The pintle 70 is of substantially U-shape and has the legs 71 thereof extended into the tube 25b, as shown in Figure 7.

The valve 67 is formed at the opposite end thereof with an outwardly extending ear or keeper 72 and the valve member 68 is formed with an outwardly extending ear 73. The ear 72 is formed with a convex lower edge 74, as shown in Figure 7. A valve locking and releasing trigger 75, which is formed with a right angularly disposed lower end 76 is pivotally carried by the ear 73 and in the initial position of the regulating body 42b the trigger 75 is adapted to be disposed in the position shown in Figures 7 and 8, wherein the trigger 75 engages on the inner side of the keeper or ear 72 and thus holds the two valve members 67 and 68 in port closing position. However, when the regulating member 42b has lost its buoyancy and moves downwardly on the tube 25b the regulating member 42b will engage the outwardly curved trigger 75 and swing this trigger outwardly to a released position with respect to the keeper 74. At this time the pressure of the liquid within the tube 25b will force the valve members 67 and 68 outwardly so as to thereby permit the liquid to circulate from the dome 26b through the lower portion of the tube 25b and then through the openings 66 into the brew container, and below the brew material holder.

In Figures 9 and 10 there is disclosed a further modification of this invention wherein the brew conducting tube 25c is formed upwardly from the lower end thereof with a pair of diametrically opposed openings 60c which are in the initial buoyant condition of the regulating member 42c adapted to be covered by the guiding tube 43b, which is fixed to the cup-shaped regulating member 42c. The tube 43b is substantially larger in diameter than the tube 25c and is formed with a pair of ribs or flanges 44c and 45c, which engage the lower end portion of the regulating member 42c within an opening 77 which is formed in the bottom or lower end portion of the regulating member 42c.

A pair of substantially semi-circular valve members 78 and 79 are adapted in the initial buoyant position of the regulating member 42c to engage within the tube 43b and cover the openings 60c. The valve member 78 is formed with a pair of arms 80 and the valve member 79 is formed with a similar pair of arms 81. The two pairs of arms 80 and 81 are pivotally secured to the tube 25c by pivot members 82. With the construction shown in Figures 9 and 10 after the regulating member 42c has lost its buoyancy and has dropped downwardly to the position shown in Figure 1, the two semi-cylindrical valve members 78 and 79 will be permitted to freely swing downwardly to an open position so that the two ports or openings 60c will be in communication with the brew container below the brew material holder, and thus break the circulation of the brew through the tube 25c to the brew material holder.

In the use and operation of this percolator apparatus, the brew material such as coffee grounds or the like are adapted to be placed in the holder 31 and a desired quantity of water is placed in the brew container 15. The container 15 may then be placed on a heating element and when the proper amount of steam has been generated in the dome 26 the liquid will be forced upwardly through the brew conducting tube 25. This liquid will drop downwardly through the openings 35 and may also over-flow through the openings 36 and pass downwardly within the receptacle 19 along the bottom wall 21 and into the container 15. The brew dripping through the openings 35 and some portion of the brew flowing through the neck 22 will strike the inclined cap 48 and engage in the groove 52. The liquid in the groove 52 will drain through the opening 54 into the regulating member 42. Initially there is no liquid within the regulating member 42 so that when the container 15 is substantially filled with liquid the regulating member 42 will rise to substantially the dotted line position shown in Figure 1. At this time the circulation breaking ports 60 will be covered so that normal circulation will be provided through the entire length of the brew conducting tube 25.

As the brew flows into the regulating member 42 this member will lose its buoyancy and gradually drop downwardly until it is in the position shown in full lines in Figure 1. At this time the ports 60 will be uncovered so that circulation will be broken through the entire length of the tube 25. As circulation is broken through the entire length of the tube 25, the brew will no longer be discharged into the holder 31 and the strength of the brew in the container 15 will remain in the same condition it was in at the time the regulating member 42 moved to its lowermost position. The container 15 may be left on the heating means for an indefinite period of time after the regulating member 42 has dropped downwardly to its circulation breaking position without affecting the strength of the brew. If desired the percolating apparatus may be removed from the container 15 in order to serve the brew and to assist in the pouring of the brew from the container 15, I have provided a hinged cap 83 which is hinged as at 84 to the handle 16. The cap 83 also is provided with a pouring spout 85 so that when the cap 83 is in position on top of the mouth or flange 18 the brew may be freely poured out through the spout 85.

Referring now to the structure shown in Figures 11 to 13 inclusive, the numeral 86 designates generally a coffee pot or brew container formed with a side wall 87 and a bottom wall 88. A brew conducting tube 89 is disposed centrally of the brew chamber 90 and is provided at its upper end with a brew material holder similar to that shown in Figure 1. The lower end of the tube 89 has secured thereto a generating dome 91, which is substantially deeper than the dome 26 and is provided with lower openings 92 through which the liquid is adapted to pass. A regulating or controlling member 93 is slidable on the tube 89 and is constructed in every way similar to the regulating member designated 41 in Figure 1. The regulating member 93 includes a removable cap 94 having a deflector plate 95 on the upper portion thereof for deflecting the liquid dripping from the material holder, while at the same time providing an air space 96 above the cap 94 for exhausting of air from the regulator 93 as the liquid enters this regulator.

An electric heater generally designated as 97 is disposed below the bottom wall 88 and in the present instance is formed in an extension of the side wall 87. It will, of course, be understood that the electric heater structure 97 may be formed as a separate unit from the brew container 86. A heating coil 98 is disposed in the heating chamber 99 positioned below the bottom wall 88 and is adapted to be connected by means of conductors 100 and 101 to a suitable source of electric current supply. A switch structure generally designated as 102 is disposed within the heating chamber 99 and includes a stationary contact 103 and a movable contact 104, which is carried by a rock arm 105. The rock arm 105 is pivotally carried by a pivotal mounting 106 fixed to the under side of the bottom wall 88 and one end of the rock arm 105 is provided with a counterbalancing weight 107. The rock arm 105 is of such construction that the movable contact 104 will be normally maintained into engagement with the fixed contact 103. The fixed contact 103 is insulated from the bottom wall 88 by an insulating member 108. The two contacts 103 and 104 are interposed in the present instance in the conductor 100.

In order to provide a means whereby when the regulating member 93 is in a submerged or lower position the movable contact 104 will be moved to circuit breaking position, I have provided a permanent magnet 109 which is carried by an arm 110. The magnet 109 and the arm 110 are pivotally mounted on a pivot member 111 carried by a pair of ears 112 fixed, as at 113, to the dome 91. The dome 91 is provided with an elongated slot 114 in the side thereof and a longitudinally bent magnet operating rod 115 is fixed at one end to the arm 110 and projects outwardly through the slot 114. The arm 115 is bent reversely over the dome 91 and is provided at its other free end with a fork 116, which engages on opposed sides of the tube 89 in the path of the movement of the regulator 93. In this manner when the regulator 93 is lowered to its lowermost position the regulator 93 will strike the fork 116 and effect a lowering of the magnet 109. When the magnet 109 is in its lowermost position this magnet will draw the metal member 107 upwardly and thus swing the arm or lever 105 to a circuit breaking position.

While I have shown the electric heating means 97 as embodying only a single coil, it will be apparent that if desired there may be several coils in the heating chamber 99 and one or more additional contacts associated with the lever 105 in order to provide a reduced heating capacity in the heating chamber 99 when the regulating member 93 is in a lowermost position. In this manner the regulating member 93 will automatically provide for a reduced heating of the brew in the container 86 whereas in the structure shown in Figure 11 the rocking of the switch lever 105 will completely cut off the electric current to the heating element 98.

What I claim is:

1. In a beverage brewing apparatus, a fluid conducting tube open at each end and having a by-pass opening upwardly from the lower end thereof, a dome member at the lower end of said tube, a perforate brew material holder carried by the tube adjacent the upper end thereof, and a hollow initially buoyant regulator slidable on said tube, said regulator having means at the upper portion thereof for admitting a predetermined quantity of brew drippings from said holder into said regulator whereby said regulator will gravitatingly lower on said tube and effect outlet of the liquid in said tube through said opening.

2. In a beverage brewing apparatus, a fluid conducting tube, a steam generating dome at the lower end of said tube, a perforate brew material holder carried by the upper portion of said tube, and initially buoyant means slidably carried by said tube between said dome and said holder and rendered non-buoyant by the brew for breaking circulation of the liquid to said holder after a predetermined brewing period while permitting circulation of the liquid from said dome into the brew receptacle.

3. In combination a brew container, a vertical brew circulating tube in said container, a brew actuating dome at the lower end of said container, a brew material holder carried by the opposite end of said tube, and an initially buoyant circulation regulator slidably carried by said tube and rendered non-buoyant from the drippings from said holder whereby said regulator will thereafter gravitatingly move downwardly on said tube, said tube and said regulator having correlated means operable upon downward movement of the latter whereby the brew in said tube will be by-passed into said container below said holder.

4. In combination a brew container, a vertical brew circulating tube in said container, a brew actuating dome at the lower end of said container, a brew material holder carried by the opposite end of said tube, and an initially buoyant circulation regulator slidably carried by said tube and rendered non-buoyant from the drippings from said holder whereby said regulator will thereafter gravitatingly move downwardly on said tube, said tube and said regulator having correlated means operable upon downward movement of the latter whereby the brew from said dome will be by-passed into said container below said holder and above said regulator.

5. In combination a brew container, a vertical brew circulating tube in said container, a brew actuating dome at the lower end of said container, a brew material holder carried by the opposite end of said tube, and an initially buoyant circulation regulator slidably carried by said tube and rendered non-buoyant from the drippings from said holder whereby said regulator will thereafter gravitatingly move downwardly on said tube, said tube and said regulator having correlated means operable upon downward movement of the latter whereby the brew from said dome will be by-passed into said container below said holder and below said regulator.

6. As a new article of manufacture an automatically operable percolator means for insertion in a liquid container, comprising a brew material holder, a liquid actuator below said holder, a conducting tube connecting said holder and actuator, a cup-shaped drip receiver and circulation regulator slidably carried by said tube, a cap for said receiver having an opening therethrough whereby a predetermined quantity of drippings will enter said receiver and thereby render the latter non-buoyant, said tube having an opening therein so positioned that upon downward movement of said receiver said opening will permit the liquid to enter the container below said holder.

7. In combination a brew container, a percolator means in said container, an electric heater, a normally closed magnetically opened switch connected with said heater, and an initially buoyant brew catching means operable upon being rendered non-buoyant from the drippings of the brew for moving said switch to an open position.

8. In combination, a brew container, a percolator means in said container, an electric heater for said container, a weight operated normally closed switch connected with said heater, a switch operating magnet in said container, means pivotally mounting said magnet on said percolator means for vertical rocking whereby in an upper position of said magnet the energy of said magnet will not affect the position of said switch and in a lower position of said magnet the energy of said magnet will draw a portion of said switch thereto for breaking the circuit to said heater, and an initially buoyant drip receiving member movably carried by said percolator and upon downward movement thereof by loss of buoyancy to swing said magnet to a position whereby the energy of said magnet will move the switch to a circuit breaking position.

9. In a percolator, a brew material holder, a brew receiving and containing chamber, a transfer means for circulating the brew through said holder from and back into said chamber, an initially buoyant container-like means arranged in the circulatory path of the brew and initially elevated by the latter for trapping a part thereof on its downward flow, a heater, and means operable by the weight of the entrapped liquid and the weight of said container-like means for rendering said heater ineffective to provide the necessary percolating heat.

10. In a beverage brewing apparatus of the percolator type through which a fluid is adapted to percolate, a vertically disposed transfer tube for directing the fluid onto the material, said tube having an opening therein above the lower end thereof, an initially buoyant and subsequently gravity lowerable fluid receiving structure floatingly engaging within the fluid and disposed in the downward path of the fluid, for receiving a predetermined portion of the fluid and caused by the fluid received therein to gradually lose buoyancy and assume a lowered position, said structure being vertically slidable on said tube and when fully buoyant initially covering said opening, said structure when in is lowered position uncovering said opening to thereby provide a restricted circulating path for the brew.

11. In a beverage brewing apparatus of the type including a fluid receiving and containing chamber, a holder for the material through which the fluid percolates, and a transfer means for effecting circulation of the fluid from the chamber and through the holder; an initially buoyant and subsequently gravity lowering structure floatingly engaging the liquid below said holder for receiving a predetermined amount of the fluid in the course of circulation, and means carried by said transfer means and effective upon lowering of said structure by the loss of buoyancy thereof for providing a restricted circulatory path for the fluid which includes only a portion of said transfer means.

12. In a beverage brewing apparatus of the type including a fluid receiving and containing chamber, a holder for the material through which the fluid percolates, and a transfer means for effecting circulation of the fluid from the chamber and through the holder; an initially buoyant and subsequently gravity lowering structure floatingly engaging the liquid below said holder for receiving a predetermined amount of the fluid in the course of circulation, said transfer means having a pair of opposed openings below the holder, a pair of semi-cylindrical closure members for said openings pivotally carried by said transfer means and maintained in opening closing position during the initial buoyancy of said structure, said closure members being released for free swinging to an open position upon lowering of said structure due to the loss of buoyancy of said structure to thereby provide a restricted circulatory path for the fluid below the holder.

13. In a beverage brewing apparatus of the type including a fluid receiving and containing chamber, a holder for the material through which the fluid percolates, and a transfer means for effecting circulation of the fluid from the chamber and through the holder; an initially buoyant and subsequently gravity lowering structure floatingly engaging the liquid below said holder for receiving a predetermined amount of the fluid in the course of circulation, said transfer means having a pair of openings adjacent the lower end thereof, a pair of semi-circular closure members, means pivotally mounting said members on said transfer means, and trip means carried by said closure members disposed in the path of the downward movement of said structure for releasing said members when said structure is in a lower position to thereby provide a restricted circulatory path for the fluid below the holder.

14. In a beverage brewing apparatus of the type including a fluid receiving and containing chamber, a holder for the material through which the fluid percolates, and a transfer means for effecting circulation of the fluid from the chamber and through the holder; an initially buoyant and subsequently gravity lowering structure for receiving a predetermined amount of the fluid in the course of circulation, said transfer means having a pair of openings adjacent the lower end thereof, a pair of semi-circular closure members, means pivotally mounting said members on said transfer means, a pair of spaced ears carried by said members, and a trigger pivotally carried by one ear and engageable with the other ear for releasably locking said members about said opening, downward movement of said structure caused by loss in buoyancy thereof effecting engagement of said structure with said trigger to thereby swing said trigger to a released position.

15. In combination a brew container, a percolator means in said container including a perforate material holder, a generating dome, a tubular brew transfer communicating said dome with said holder, an electric heater, a regulating switch connected to said heater, drip receiving means disposed in the path of the drippings from said holder and movable downwardly by the weight of the drippings, and means disposed in the path of the downward movement of said drip receiving means correlated with said switch for moving said switch to circuit breaking position.

16. A percolator comprising in combination a liquid receptacle, a brew generating means in the receptacle including a normal liquid passage providing a normal circulatory brew generating path for the liquid and an intermediate outlet providing a non-generating path for the liquid, and an initially buoyant hollow regulator member movably carried by said generating means and in normal operating position closing said intermediate outlet, said member on being gradually rendered non-buoyant by the liquid circuating in said normal path, then opening said intermediate outlet to thereby provide for the circulation of the liquid through said non-generating path.

17. In combination a brew container, a brewing means in said container, and an initially buoyant hollow regulator member rendered non-buoyant by the brew for automatically regulating the operation of the brewing in accordance with the quantity of brew generated in said container, said member being provided with means whereby to control the rate of drippings received therein.

BENJAMIN J. STEINMETZ.